United States Patent [19]

Arnot, Jr.

[11] 3,879,290
[45] Apr. 22, 1975

[54] DOMESTIC SEWAGE SYSTEM

[76] Inventor: Nathaniel D. Arnot, Jr., 12 First Street, Westfield, N.Y. 14787

[22] Filed: May 29, 1973

[21] Appl. No.: 364,526

[52] U.S. Cl. .............. 210/110; 210/121; 210/139; 210/199; 210/203
[51] Int. Cl. ............................................. C02c 1/02
[58] Field of Search ............ 210/15, 62, 63, 97, 98, 210/109, 110, 138, 139, 195, 201, 203, 209, 220, 199, 121

[56] References Cited
UNITED STATES PATENTS

| | | | |
|---|---|---|---|
| 2,709,680 | 5/1955 | Watson | 210/138 X |
| 3,326,747 | 6/1967 | Ryan et al. | 210/63 X |
| 3,386,915 | 6/1968 | Rutschi | 210/62 |
| 3,440,669 | 4/1969 | Boester | 210/220 X |
| 3,487,015 | 12/1969 | Boester | 210/15 X |
| 3,543,294 | 11/1970 | Boester | 210/220 X |
| 3,660,277 | 5/1972 | McWhirter et al. | 210/15 X |
| 3,679,053 | 7/1972 | Koulovatos et al. | 210/138 X |
| 3,681,236 | 8/1972 | Bergles et al. | 210/139 X |

OTHER PUBLICATIONS

Pollution Control Handbook No. 2, Waste Water Cleanup Equipment, C. Pazar, 1971, pp. 436–439, (6/2/71).

Primary Examiner—Charles N. Hart
Assistant Examiner—Robert H. Spitzer
Attorney, Agent, or Firm—Hoffman Stone

[57] ABSTRACT

A domestic sewage system including two aeration and filtration tanks in flow series with each other and constantly aerated. A third tank receives the effluent from the second one, and intense oxidation is carried out in it intermittently under control of a level sensing device. The contents of the third tank are discharged following the oxidation.

5 Claims, 2 Drawing Figures

PATENTED APR 22 1975   3,879,290

DOMESTIC SEWAGE SYSTEM

BRIEF DESCRIPTION

This invention relates to a novel water treatment system, and, more particularly, to a sewage disposal system for domestic use, especially in regions where septic tanks or other methods of disposal are not suitable.

The system of the invention produces a substantially sterile effluent that may be discharged directly into streams or lakes, or onto lawns, or the like without harmful effect. The system is compact, relatively inexpensive, reliable, and long-lasting, and requires relatively little maintenance.

Briefly, the system of the invention comprises two tanks, or sections of a single tank, in flow series with each other, in which the sewage is contained within filter bags and continuously aerated. Solids are retained in the respective tanks, or sections, by the filter bags while the liquids pass from the first tank into the second, and out of the second one. A third tank, or section, is provided to receive the effluent from the second one, and to treat it by intense oxidation such as ozonation, for example, or treatment with chlorine dioxide. Treatment in the third tank is intermittent. The level of the liquid in it is sensed, and oxidation is carried out only for a predetermined interval after the tank becomes filled. Therafter, the tank is emptied, and the oxidizer remains quiescent until the tank is once again filled.

DETAILED DESCRIPTION

Figure 1:
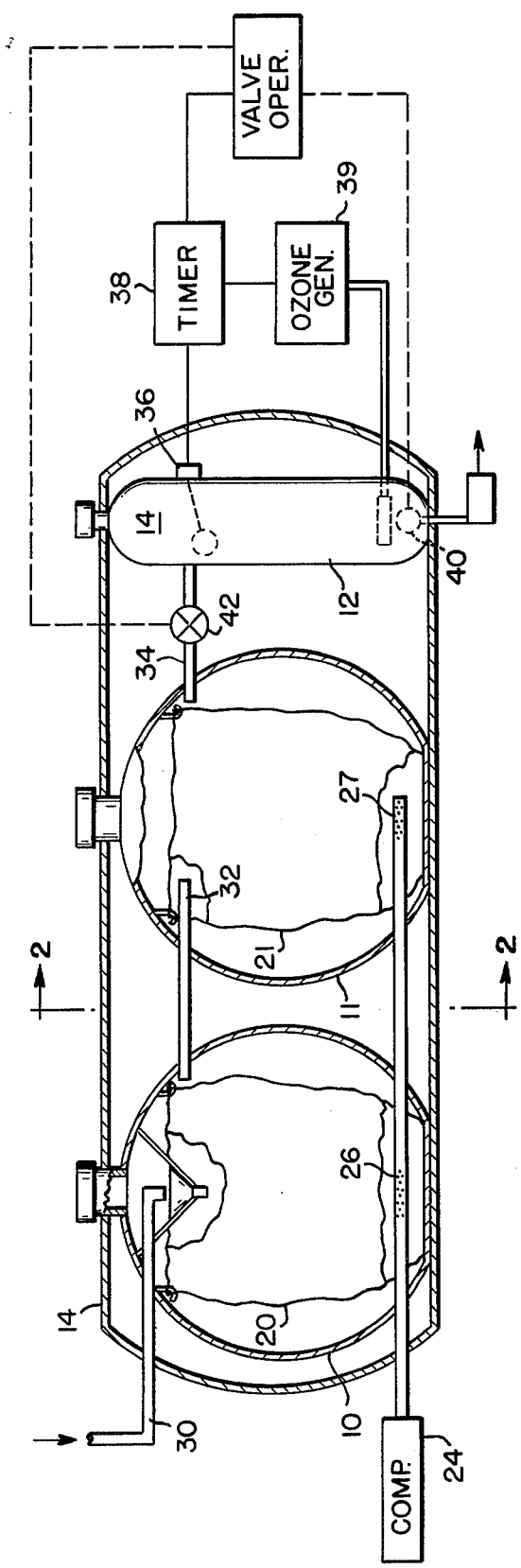
Figure 2:
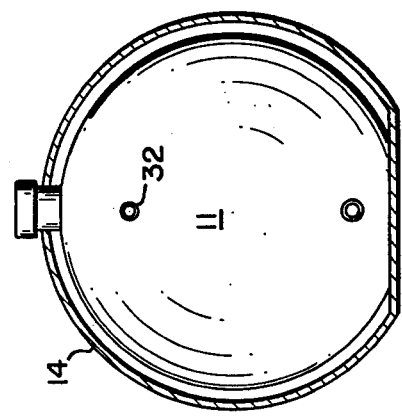

A presently preferred embodiment of the invention will now be described in conjunction with the drawing, wherein FIG. 1 is a longitudinal sectional view of sewage treatment apparatus according to the invention; and FIG. 2 is an end elevational view of the apparatus shown in FIG. 1.

Referring now to the drawing, the apparatus as shown comprises three tanks 10, 11, and 12, respectively, preferably mounted within a single enclosure 14. The first two tanks 10 and 11 are of approximately the same size and considerably larger than the third tank 12. Each of the first two tanks 10 and 11 may have a capacity, for example, of about 150 to 200 gallons. The first two tanks 10 and 11 are lined with loosely supported filter bags 20 and 21, respectively, for retaining solids, and aeration is provided from a compressor 24, or other source, through diffusers 26 and 27, respectively, at the bottoms of the tanks within the bags 20 and 21.

The inlet 30 is at or near the top of the tank 10, and is arranged to discharge sewage from the domestic establishment into the bag 20 in the first tank. Liquid discharged from the first tank 10 flows through a nipple 32 into the bag 21 in the second tank, where it is further aerated. Liquid discharged from the second tank 11 passes through another nipple 34, which is below the nipple 32, into the third tank 12.

The third tank 12 is preferably packed, as are chemical columns, for maximum interaction between the liquid in it and the gas used to treat the liquid. Most of the time no action or treatment takes place in the third tank 12. It simply fills in accordance with the demand made on the system. The third tank, as hereinabove mentioned, is smaller than the first two tanks. It may be, for example, of about 50 to 100 gallons capacity, depending upon the design load. A level sensing device such as the float operated switch 36 shown is provided for producing a signal when the third tank is filled to a predetermined level, preferably a few gallons below the level of the inlet nipple 34. The signal produced by the switch 36 actuates a timer 38, which energizes an oxidizing device 39 such as an ozonator or the discharge valve of a tank of chlorine dioxide for a predetermined interval, say about 30 minutes to 1 hour. After another interval of about 5 to 10 minutes, the timer actuates a discharge valve 40 at the bottom of the third tank to empty it, holding the valve open long enough to ensure discharge of the entire contents of the tank.

As shown, another valve 42 is provided at the nipple 34 to shut off flow of liquid from the second tank 11 into the third tank 12 during the oxidation treatment and discharge of the effluent from the third tank. The valve 42 is also controlled by the timer 38. It ensures that only fully treated water is discharged from the system by preventing the introduction of non-oxidized water into the third tank 12 when there may not be enough time for it to be fully oxidized before being discharged.

The entire apparatus may be made as a single, compact unit, with the compressor, timer and oxidizing gear also mounted within the enclosure 14.

Only simple maintenance is required such as semiannual inspections and lubrication of operating parts, and occasional inspections of the filter bags 20 and 21.

It is not possible, even with an oxidizer as powerful as ozone or chlorine dioxide, to destroy all the organic matter in the waste water within practicable limits of time and treatment concentrations. However, in most cases, treatment with ozone at about 5 grams of ozone per hour per 50 gallons of water for a period of ½ to 1 hour is fully adequate to destroy all bacteria in the water and to sterilize it sufficiently to make it acceptable for discharge into public streams and lakes. The actual time and concentration of treatment required in any particular instance depends upon the load placed on the system, i.e., the amount and nature of the contaminants in the sewage. For ordinary domestic use, where the sewage is not highly diluted with shower drainage and laundry waste, relatively long treatment times of, say, about an hour are desirable. In other cases, where the bacterial content of the sewage is relatively less by reason, for example, of dilution, shorter treatment periods are sufficient.

It is, of course, contemplated that failure alarms and shutdown devices will ordinarily be included in the control system to avoid accidental discharge of untreated sewage in the event of failure.

A major advantage of the practice of the invention relative to prior systems that made use of intense oxidation is the intermittent operation of the oxidizer, which is much less costly and produces less corrosion of the gear than does continuous intense oxidation as widely used previously.

What is claimed is:

1. A sewage treatment system particularly for domestic use comprising:
   a. first and second tanks of generally similar size,
   b. a third tank smaller than said first and second tanks,
   c. means connecting said first, second, and third tanks in flow series with each other, d. inlet means for delivering sewage from a domestic establishment into said first tank, from which it flows into said second tank, and thence into said third tank,
e. aeration means for continuously aerating the sewage in said first and second tanks,
f. oxidizing means for oxidizing the contents of said third tank intensely,
g. discharge means for emptying said third tank, and
h. timer means for actuating said oxidizing means and said discharge means according to a predetermined sequence in response to the filling of said third tank, allowing sufficient dwell to effect substantially complete sterilization of the contents of said third tank before it is emptied.

2. A system according to claim 1 including also filter bags loosely supported in, and generally conforming to said first and second tanks for retaining solids therein.

3. A system according to claim 1 including a level sensing device for sensing the level of liquid in said third tank and actuating said timer means whenever the liquid reaches a predetermined level therein.

4. A system according to claim 1, wherein said oxidizing means comprises an ozone generating device.

5. A system according to claim 1, wherein said oxidizing means comprises a supply of chlorine dioxide and means for controllably and selectively releasing it into said third tank.

* * * * *